US 6,553,490 B1

(12) United States Patent
Kottapurath et al.

(10) Patent No.: US 6,553,490 B1
(45) Date of Patent: Apr. 22, 2003

(54) COMPUTER SYSTEM INCLUDING LOCAL COMPUTER WITH CAPABILITY TO AUTOMATICALLY UPDATE OPERATING SYSTEM OR APPLICATION PROGRAM FROM NETWORK SERVER

(75) Inventors: Sherif Kottapurath, Culver City, CA (US); Jordan Brown, Sylmar, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 748 days.

(21) Appl. No.: 08/885,393

(22) Filed: Jun. 30, 1997

(51) Int. Cl.[7] .......................... G06F 15/177; G06F 1/24
(52) U.S. Cl. ................... 713/2; 713/1; 713/100
(58) Field of Search ..................... 395/652, 651, 395/653, 700, 712

(56) References Cited

U.S. PATENT DOCUMENTS 5,142,680 A * 8/1992 Ottman et al. ............. 395/700
5,752,042 A * 5/1998 Cole et al. ................. 395/712
5,758,165 A * 5/1998 Shuff ........................ 395/712
5,761,649 A * 6/1998 Hill ........................... 705/27

* cited by examiner

Primary Examiner—Peter Wong
Assistant Examiner—Tim Vo
(74) Attorney, Agent, or Firm—Arter & Hadden LLP

(57) ABSTRACT

A local computer stores a current program such as an operating system or an application. A network server stores a latest program which is a latest version of the current program, and an identifier program for generating an identification corresponding to the latest program upon interrogation. An updater program is alternatively stored on the local computer or the network server for causing the latest program to be transferred from the network server to the local computer and replace the current computer program. The current program and the latest program each include a startup program configured to interrogate the identifier program, determine if the identification corresponds to the current program, and if the identification does not correspond to the current program, run the updater program.

26 Claims, 3 Drawing Sheets

COMPUTER SYSTEM INCLUDING LOCAL COMPUTER WITH CAPABILITY TO AUTOMATICALLY UPDATE OPERATING SYSTEM OR APPLICATION PROGRAM FROM NETWORK SERVER

BACKGROUND OF THE INVENTION

1. Field of the Invention

The present invention generally relates to the art of digital computer systems, and more specifically to a computer system including a local computer having the capability to automatically update its operating system or an application program from a network server upon startup.

2. Description of the Related Art

Operating systems and other software such as application programs are installed on a mass storage such as a hard drive of a local computer for reasons including speed, reduction in network load, etc. This requires an initial install and subsequent upgrading to accommodate bug fixes, new features, as well as other changes.

Historically, upgrading is performed using a floppy drive and/or a CD-ROM drive of the local computer. There are also mechanisms by which users can initiate the installation/upgrade over a network, but this requires intervention by the user in terms of inserting special floppy disks, typing special commands, etc., on the local computer.

It is desirable to have a mechanism whereby this process can take place automatically such that new versions of the software when installed on the server will migrate to the local computers on the network without user intervention. This should also happen such that network failure during an upgrade does not leave a local computer in an inconsistent state.

SUMMARY OF THE INVENTION

The present invention overcomes the drawbacks of the prior art by providing a method and system by which a program such as an operating system which is stored on a local computer can be automatically updated from a network server upon startup of the local computer. The invention obviates the necessity for a user to periodically determine if he or she has the latest version of the software. The invention also minimizes the time required for distribution of a new software version to a plurality of users, and further eliminates the need for any physical media such as CD ROMs, floppy disks, to distribute a software update.

More specifically, a computer system according to the present invention includes a local computer which stores a current program such as an operating system or an application program. A network server stores a latest program which is a latest version of the current program, and an identifier program for generating an identification corresponding to the latest computer program upon interrogation.

An updater program is alternatively stored on the local computer or the network server for causing the latest program to be transferred from the network server to the local computer and replace the current program.

The current program and the latest program each include a startup program configured to interrogate the identifier program, determine if the identification corresponds to the current program, and if the identification does not correspond to the current program, run the updater program.

These and other features and advantages of the present invention will be apparent to those skilled in the art from the following detailed description, taken together with the accompanying drawings, in which like reference numerals refer to like parts.

DETAILED DESCRIPTION OF THE INVENTION

The present invention provides a mechanism for installing and upgrading an operating system or application program on a mass storage device such as a hard drive of a local computer without user intervention.

This is achieved by providing the local computer with two alternate methods of starting or booting up which can be controlled by software. For example, on open boot compatible SPARC machines, the boot-device parameter can be changed by software to alternate between booting off the network server or the hard drive. On IBM Compatible PCs, the active partition on the hard drive can be changed to boot from two different partitions of the hard drive.

One of the two methods of starting up will load and run the operating system or application program. The other method is used to update the software used in the first method. The software involved in the first method will be referred to as the operating software, and the software involved in the second method will be referred to as the updater.

The operating software has to reside on the local storage of the local computer. The local storage has to be writable by software running on the local computer. The local computer also should have the capability to restart itself under software control.

During startup (and optionally periodically subsequent to startup), the operating software will check with a server, e.g. a Dynamic Host Configuration Protocol (DHCP) server, as to its own expected version number. If the version number does not match the expected version, then the operating software will change the start up mechanism to run the updater and restart the computer. The updater will download the expected copy of the operating software and write it onto the local storage. After validating that the copy that was downloaded is correct (using checksums or some other error checking mechanism), the updater will set the start up mechanism to run the operating software and restart the computer.

The mechanism described above allows the computer to update its operating software without any operator intervention except to set up the server to indicate the new expected version and to provide a copy of the expected operating software to be downloaded from the server. This mechanism is capable of surviving network/server failures during the update without leaving the local computer in an inconsistent or irrecoverable state.

Figure 1:
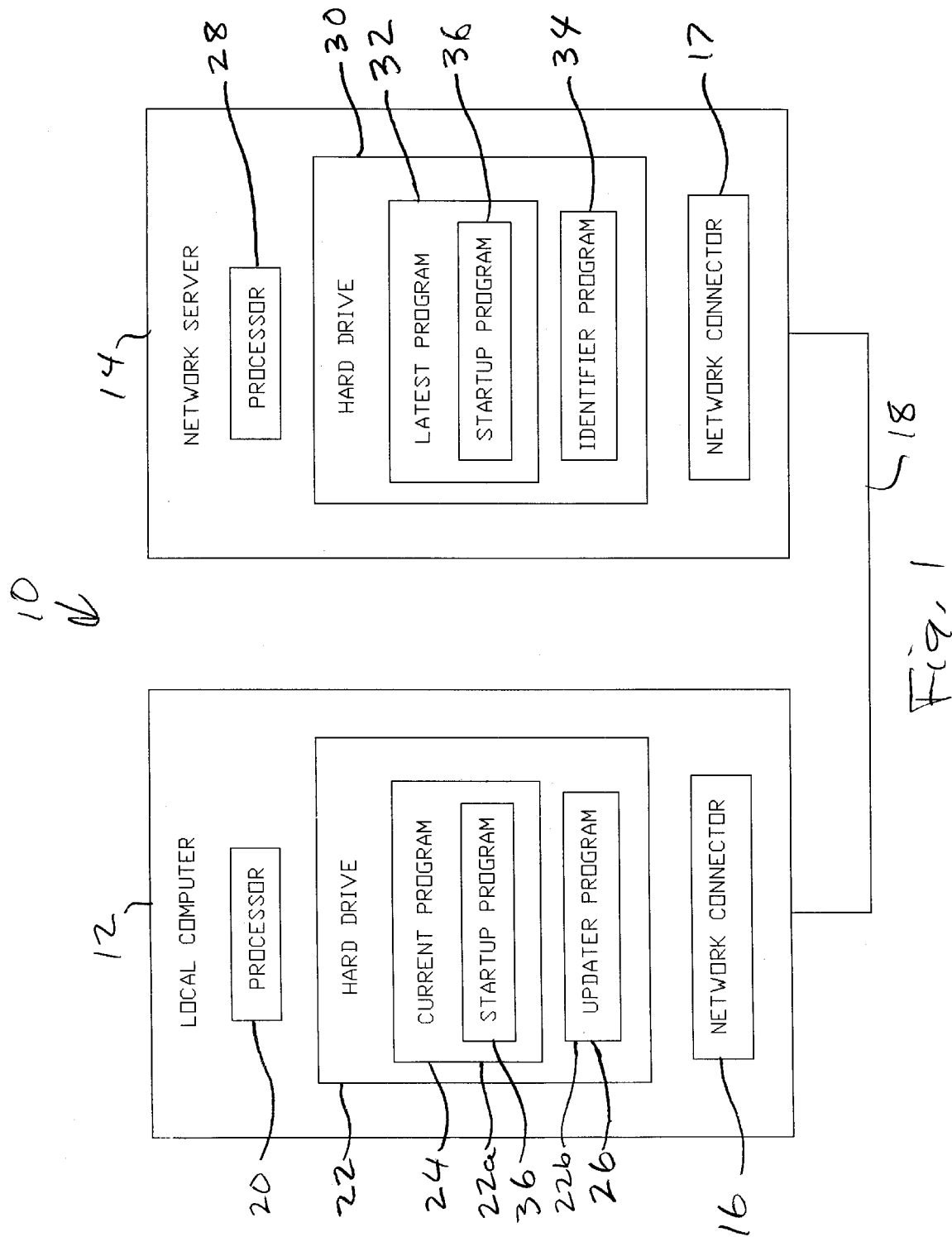
FIG. 1 is a block diagram illustrating a computer system according to the present invention including an updater program which is provided at a local computer.

As illustrated in FIG. 1, a computer system according to the present invention is generally designated as 10, and includes a local computer 12 and a network server 14 which are interconnected via a network connector 16 at the local computer 12, a network connector 17 at the network server, and a network link 18.

The local computer 12 is typically a personal computer (PC) workstation which includes standard components such as volatile and non-volatile memory, a keyboard, magnetic and/or optical mass storage drive, mouse, etc. which are not the subject matter of the invention and are not shown.

In accordance with the invention, the local computer 12 includes a processor 20, and a mass storage device such as a hard drive 22. The hard drive 22 is divided into two independently bootable partitions 22a and 22b which store a current program 24 and an updater program 26 respectively.

The current program 24 is preferably an operating system such as MS DOS or UNIX, but can alternatively be an application program such as a word processor, database, etc. In the following description the current program 24 will be assumed to be an operating system, although the invention is not so limited.

The network server 14 includes a processor 28, and a hard drive 30 or other mass storage device which stores a latest program 32, which is a latest version of the current program 24. An identifier program 34 is also stored as a code segment on the hard drive 30 which generates an identification of the latest program 32 upon interrogation. The identification is a digital code indicating the version number, release date, etc. of the latest program 32.

In accordance with the invention, copies of a startup program 36 are included in the current program 24 and the latest program 32. The startup program 36 is executed upon startup of either the current program 24 or the latest program 36 and, when run on the local computer 12, causes the local computer 12 to continue loading and run the current program 24, or restart (reboot) the computer 12 from the second partition 22b, depending on an identification generated by the identifier program 34.

Figure 3:
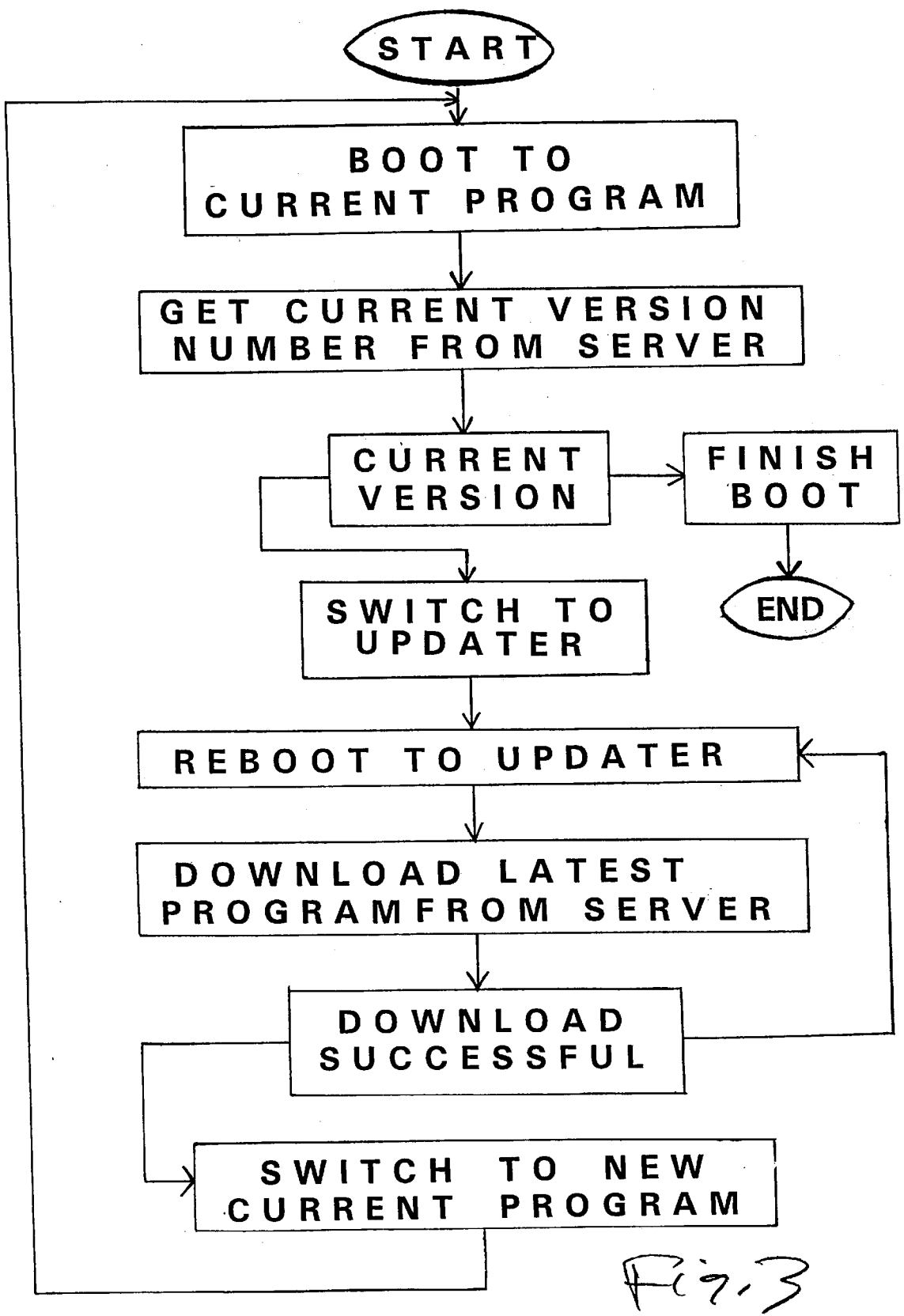
FIG. 3 is a flowchart illustrating the operation of the present computer system.

In operation, the present method begins when the operator of the local computer 12 turns on or reboots or otherwise re-starts the computer 12. The steps of the method are illustrated in FIG. 3.

Startup of the computer 12 causes the current program 24 (operating system) to run. The startup program 36 is executed before the functional components of the operating system are loaded, and includes an interrogation code segment which sends an interrogation to the network server 14 via the connector 16 and link 18. The interrogation is a digital code requesting the identification (version number, etc.) from the identifier program 34.

The server 14 is configured such that the interrogation is routed to the identifier program 34, which includes a receiving code segment that receives and processes the interrogation, and an identification generating code segment that generates and sends the identifier to the local computer 12. The startup program 36 includes an identifying code segment which compares the version number, release date, etc. represented by the identifier with the corresponding data for the current program 24. If this data is the same, indicating that the current program 24 is the latest version of the operating system (the same as the program 32), the startup program 36 causes the functional components of the operating system to be loaded, and control transferred to the operating system (current program 24). The functionality of the identifier program 34 can be implemented using DHCP protocol.

If the data is not the same, indicating that the latest program 32 is a newer version of the operating system than the current program 24, the startup program 36 reconfigures the computer 12 so that it will run the updater program 26 from the second partition 22b on subsequent restarts and reboots, and then restarts or robots the computer 12. This is performed using, for example, the standard IBM DOS utility "FDISK", or any other suitable implementation.

The updater program 26 includes a transferring code segment which controls the computer 12 to download a copy of the latest program 32 from the network server 14 using any applicable network transfer protocol and store it in the first partition 22a of the hard drive 22 to overwrite or replace the current program 24. Upon successful completion of the download operation (e.g. using checksum verification, etc.), the updater program 26 reconfigures the computers 12 so that on subsequent restarts and reboots it will run the latest program 32 which was just stored in partition 22a, and then restarts or reboots the computer 12. This latest program 32 is redesignated as the new current program 24.

When the new current program 24 is run, the startup program 36 thereof performs the interrogation and identification procedure described above. Since the new current program 24 is the latest version of the operating system, the identifier returned by the identifier program 34 will correspond to the current program 24, and the operating system components will load and run.

If, during transfer of the latest program 32 from the network server 14 to the local computer 12, a malfunction occurs (e.g. the server 14 or link 18 fails) such that the transfer is unsuccessful, the updater program 26 terminates the downloading operation and initiates another attempt to download the latest program 32. This operation is repeated until the program 32 is successfully transferred. The local computer 12 will not be left in an inconsistent or unrecoverable state because the partition 22a will not be booted until a complete and correct copy of the latest program 32 has been stored therein.

Figure 2:
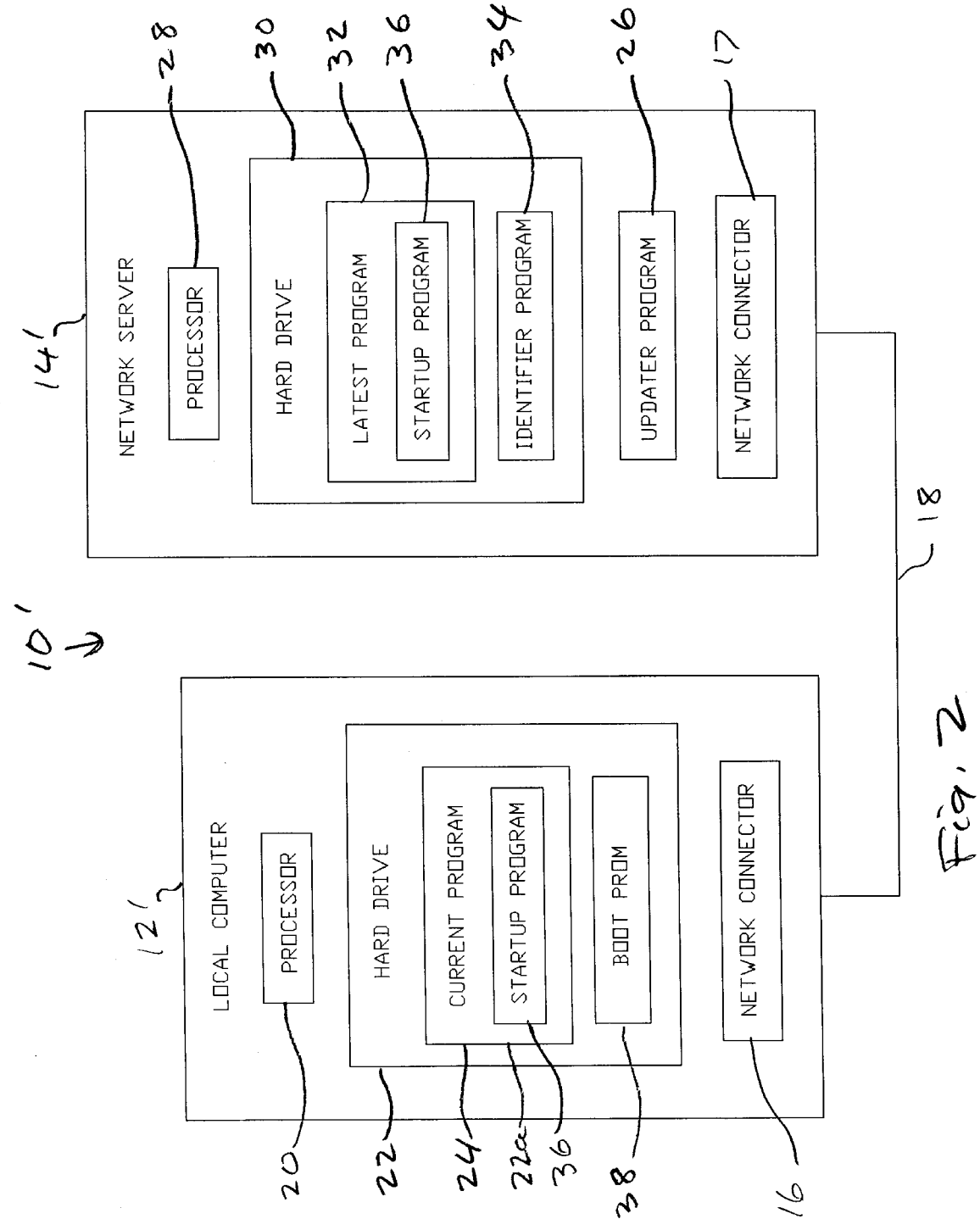
FIG. 2 is a block diagram illustrating a computer system in which the updater program is provided at a network server.

FIG. 2 illustrates another computer system 10' according to the present invention, in which like elements are designated by the same reference numerals used in FIG. 1, and corresponding but modified elements are designated by the same reference numerals primed.

The system 10' differs from the system 10 in that the updater program 26 is stored on the hard drive 30 of the network server 14 rather than on the local computer 12. In this configuration, the local computer 12' is, for example, an open-boot compatible SPARC machine, and includes a boot PROM 38 which enables the computer 12' to boot from either its own hard drive 22 or the network server 14. The server 14 is configured such that, when the local computer 12' boots therefrom, the updater program 26 is run.

The operation of the system 10' is similar to that of the system 10 except that when the startup program 36 is run by the local computer 12 upon startup or booting thereof, and the startup program 36 determines that the current program 24 is not the latest version, the startup program 36 reconfigures the computer 12' so that on subsequent restarts or reboots the boot PROM 38 will load and run the updater program 26 from the server 14, and then restarts or reboots the computer 12. The functionality for switching the boot process between the hard drive 22 and the server 14 is conventionally included in the boot PROM 38. It is also within the scope of the invention to perform switching using the boot PROM 38 in combination with software such as the FDISK utility.

In summary, the present invention overcomes the drawbacks of the prior art by providing a method and system by which a program such as an operating system which is stored on a local computer can be automatically updated from a network server upon startup of the local computer.

Various modifications will become possible for those skilled in the art after receiving the teachings of the present disclosure without departing from the scope thereof. For example, the current and latest programs can be application programs rather than operating systems, and cause the updating operation to be performed if the current program is started up and determined to be older than the latest program.

It is further within the scope of the invention to perform the downloading procedure from the server to the local computer in the background while the current operating system or program is running, and then reboot to the new version when the download is complete. In this case, a user can use the local computer during the download process.

Alternatively, the downloading process can be performed with the user disallowed from using the local computer. Data compression can optionally be used to speed up the transfer.

What is claimed is:

1. A computer system, comprising:
   a local computer configured to store a current program;
   a network server configured to store a latest program, and an identifier program for generating an identification corresponding to the latest computer program upon interrogation;
   an updater program configured to cause the latest program to be transferred from the network server to the local computer and replace the current program; and
   a startup program which is configured to run when the local computer is started up, interrogate the identifier program, determine if the identification corresponds to the current program, and if the identification does not correspond to the current program, run the updater program.

2. A computer system as in claim 1, in which:
   the local computer comprises a hard drive having first and second partitions; and
   the current computer program and the updater program are stored in the first and second partitions respectively.

3. A computer system as in claim 1, in which:
   the local computer comprises a memory configured to store a boot program which causes the local computer to boot off the network server;
   the startup program is configured to run the boot program if the identification does not correspond to the current computer program;
   the updater program is stored in the network server such that it is run when the boot program causes the local computer to boot off the network server.

4. A computer system as in claim 1, in which the latest program is a latest version of the current program.

5. A computer system as in claim 1, in which the current program and the latest program are operating systems.

6. A computer system as in claim 1, in which copies of the startup program are included in the current program and in the latest program.

7. A computer system as in claim 6, in which the current program and the latest program are configured such that the startup program runs when the current program or the latest program is started.

8. A computer system as in claim 7, in which the current program and the latest program are operating systems.

9. A computer system as in claim 1, in which the current program and the latest program are application programs.

10. A computer system as in claim 1, in which the local computer is configured to store the updater program.

11. A computer system as in claim 1, in which the network server is configured to store the updater program.

12. A computer system as in claim 1, in which the updater program is configured to, upon successful transfer of the latest program from the network server to the local computer, cause the local computer to run the latest program.

13. A computer system as in claim 1, in which the updater program is configured to repeatedly attempt to transfer the latest program from the network server to the local computer until a transfer has been successfully completed.

14. A method for automatically updating a current program on a local computer which is connected to a network server, comprising the steps of:
   (a) storing the current program on the local computer;
   (b) storing a latest program on the network server;
   (c) storing an identifier program on the network server for generating an identification corresponding to the latest program upon interrogation;
   (d) providing an updater program for causing the latest program to be transferred from the network server to the local computer and replace the current program;
   (e) providing a startup program configured to interrogate the identifier program, determine if the identification corresponds to the current program, and if the identification does not correspond to the current computer program, run the updater program; and
   (f) running the startup program.

15. A method as in claim 14, in which:
   the local computer comprises a hard drive having first and second partitions; and
   step (a) comprises storing the current program in the first partition; and
   step (d) comprises storing the updater program in the second partition.

16. A method as in claim 14, in which:
   the local computer comprises a memory configured to store a boot program which causes the local computer to boot off the network server;
   step (e) comprises configuring the startup program to run the boot program if the identification does not correspond to the current computer program;
   step (d) comprises configuring the updater program such that it is run when the boot program causes the local computer to boot off the network server.

17. A method as in claim 14, in which the latest program is a latest version of the current program.

18. A method as in claim 14, in which the current program and the latest program are operating systems.

19. A method as in claim 14, in which step (e) comprises configuring the current program and the latest program to each include a copy of the startup program.

20. A method as in claim 19, in which:
   step (a) comprises configuring the current program such that the startup program runs when the current program is started; and
   step (b) comprises configuring the latest program such that the startup program runs when the latest program is started.

21. A method as in claim 20, in which the current program and the latest program are operating systems.

22. A method as in claim 14, in which the current program and the latest program are application programs.

23. A method as in claim 14, in which step (d) comprise storing the updater program on the local computer.

24. A method as in claim 14, in which step (d) comprise storing the updater program on the network server.

25. A method as in claim 14, in which the updater program is configured to, upon successful transfer of the latest program from the network server to the local computer, cause the local computer to run the latest program.

26. A method as in claim 14, in which the updater program is configured to repeatedly attempt to transfer the latest program from the network server to the local computer until a transfer has been successfully completed.

* * * * *